United States Patent Office 2,745,874
Patented May 15, 1956

2,745,874

INSECTICIDAL DERIVATIVES OF DIPHENYL UREA

Guido Schetty and Walter Stammbach, Basel, and Robert Zinkernagel, Riehen, near Basel, Switzerland, assignors to J. R. Geigy A. G., Basel, Switzerland, a Swiss firm No Drawing. Application June 16, 1954, Serial No. 437,302

Claims priority, application Switzerland June 18, 1953

6 Claims. (Cl. 260—553)

The present invention concerns insecticidal derivatives of diphenyl urea which, in aqueous dispersion, have an affinity to keratine fibres and protect material so treated from injury caused by the larvae of microlepidopters and certain types of beetle. It also concerns agents suitable for treating keratine fibres in aqueous medium which agents have a content of insecticidal derivatives of diphenyl urea, the treatment of keratine fibres with such agents and the keratine material protected from injury by insects by the use of insecticidal diphenyl ureas.

It has been found that insecticidal derivatives of diphenyl urea are obtained if a reactive derivative of carbonic acid is reacted by known methods, with 2 mols of suitably substituted aminobenzene compounds, the components being so chosen that compounds of the general formula:

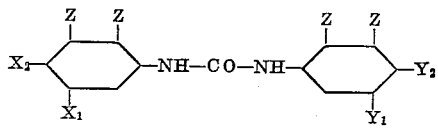

result. If necessary, the reaction can be performed in steps.

In the above formula: one X presents a trifluoromethyl group, the other X represents hydrogen or halogen, one Y represents halogen, the trifluoromethyl or the nitro group, the other Y represents hydrogen, halogen or an alkoxy group, and Z represents hydrogen or halogen.

A particularly active class of insecticidal derivatives of diphenyl urea according to the present invention are those in which the two X's represent a pair of substituents consisting of halogen and the trifluoromethyl group, the latter preferably being in the m-position to the carbamide bridge. In the group of the most active compounds, these conditions are also fulfilled for the two Y substituents.

For technical and practical reasons, chiefly chlorine is used as halogen substituent but also the corresponding fluoro, bromo or iodo compounds are active.

4-trifluoromethyl-2-chloro-, 4-trifluoromethyl-3-chloro-, 4-trifluoromethyl-2.5-dichloro-, 3-trifluoromethyl-, 5-trifluoromethyl-2-chloro- and, preferably 3-trifluoromethyl-4-chloro-1-aminobenzene can be used for example as suitably substituted aminobenzene compounds containing a trifluoromethyl group. To form unsymmetrically substituted diphenyl urea derivatives, the following substituted aminobenzene compounds without a trifluoromethyl group can be used for example: 4-chloro-, 4-bromo-, 4-fluoro- or 4-nitro-1-aminobenzene, 3.4-dichloro- or -dibromo-, 3-chloro-4-bromo-, 2.3.4- or 2.4.5- or 3.4.5- trichloro-1-aminobenzene, 3-chloro-4-methoxy- or 3-chloro-4-ethoxy- or 3-nitro-4-chloro-1-aminobenzene.

In the process according to the present invention, the following can be used as reactive derivatives of carbonic acid $H_2CO_3$: the acid halides, in particular phosgene, the acid esters, in particular the phenol esters, the acid halide monoesters in particular the chlorocarbonic acid phenyl ester, the acid amides or imides, in particular the urea. Chiefly phosgene and the chlorocarbonic acid phenyl ester can be used for the reaction in steps with suitably substituted aminobenzene compounds, thus producing unsymmetrically substituted diphenyl urea derivatives of the above formula. Either phosgene or chlorocarbonic acid phenyl ester is reacted by methods known per se first with only one mol of an aminobenzene compound usable according to the present invention to form the corresponding phenyl carbamic acid chloride or phenol ester, which is then converted with a second mol of an identical or another suitably substituted aminobenzene compound into the diphenyl urea derivative. If desired the reaction products from one mol of phosgene with 1 mol of aniline can also be converted into the phenyl isocyanates corresponding to the aminobenzene compounds listed by methods known per se, e. g. by heating in inert higher boiling organic solvents such as nitrobenzene or o-dichlorobenzene while splitting off hydrogen halide, and then adding suitably chosen aminobenzene compounds to these isocyanates. It is advantageous to produce the symmetrically substituted derivatives of diphenyl urea according to this invention with the aid of urea by heating in an aqueous solution 2 mols of a suitably substituted aminobenzene compound in the form of a mineral acid salt with 1 mol of urea in which reaction the diphenyl urea derivative precipitates directly in a pure form and the corresponding ammonium salt is formed.

The new insecticidal derivatives of diphenyl urea are white substances which crystallise very well and have definite melting points. They are practically insoluble in water but dissolve well in organic solvents, such as e. g. dialkyl ketones, chlorobenzenes, nitrobenzene, ethylene glycol monoalkyl ethers, pyridine bases, etc., particularly when warmed.

For use in an aqueous bath, it is advantageous to mix the finely ground powders of the active ingredient or a solution thereof in a water-miscible organic solvent with capillary active wetting and dispersing agents such as e. g. with the formaldehyde condensation product from naphthalene sulphonic acid or the alkylene polyglycol ethers of phenols which contain a higher molecular aliphatic or alicyclic hydrocarbon radical as ring substituent. On being stirred into aqueous treatment baths, such preparations produce milky dispersions from which, at slightly elevated temperature, the diphenyl urea derivatives according to the present invention are drawn on to keratine fibres, in particular on to wool and are fixed fast to washing, milling, light and dry cleaning. The keratine fibres treated with a content of at least 0.1 to 1% of active ingredient are permanently protected from injury by microlepidopters and certain types of beetles.

The new compounds have an advantage over the insecticidal agents for the treatment of keratine fibres which contain acid water-solubilising groups such as sulphonic acid or carboxyl groups in that on being used in the dye bath, the dyeing procedure need not be altered, because they do not impair the absorption power of the material to be treated. In comparison with the known halogenated diphenyl ureas which contain halogen, in particular chlorine instead of the trifluoromethyl group according to this invention, the new compounds have the advantage of a greater range of action; in particular they are also very active against the larvae of Attagenus and Anthrenus types which injure keratine fibres.

Some of the new diphenyl urea derivatives also have good bactericidal properties, e. g. against Staphylococcus aureus; in addition, some of them also have a fungicidal action.

The following examples illustrate the invention without limiting it in any way. Where not otherwise stated, the parts are given as parts by weight and the temperatures in degrees Centigrade. The relationship of parts by weight to parts by volume is as that of kilogrammes to litres.

*Example 1*

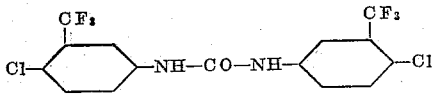

4-chloro-3-trifluoromethyl-1-aniline is reacted by methods known per se with phosgene to form 4-chloro-3-trifluoromethyl-phenylisocyanate (see Werner Siefken, Annalen der Chemie, 562, 96–136 (1948)).

222 parts of 4-chloro-3-trifluoromethyl-phenylisocyanate are dissolved in 1000 parts of abs. chlorobenzene at 60°. 196 parts of 1-amino-4-chloro-3-benzotrifluoride are added to this solution and the whole is heated for 10 hours at 95–98°, after which it is cooled. The crystalline precipitate is filtered off, washed with chlorobenzene and dried in the vacuum at 90–100°. A white powder is obtained which melts at 231–232°.

$C_{15}H_8ON_2Cl_2F_6$—Calculated: N 6.7%, Cl 17.0, F 27.3. Found: N 7.0%, Cl 17.2, F 27.3.

*Example 2*

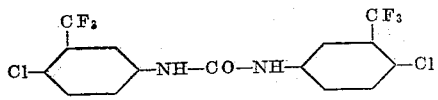

196 parts of 1-amino-4-chloro-3-benzotrifluoride are dissolved in 600 parts of acetone. Phosgene is introduced into this solution at 30–40° and at the same time a solution of 190 parts of sodium acetate in 380 parts of water is added dropwise. After the solution has become weakly acid to Congo red paper no more phosgene is introduced and the whole is stirred for a further hour at 40°. It is then diluted with 1000 parts of water, the precipitate which separates is filtered off, washed with water and dried. It is then recrystallised from chlorobenzene. A white powder which melts at 231–232° is obtained.

*Example 3*

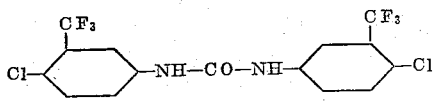

232 parts of 1-amino-4-chloro-3-benzotrifluoride chlorohydrate and 64 parts of urea are boiled for 16 hours under reflux in 700 parts of water. After cooling, the precipitate is filtered off, pasted in water, made alkaline by the addition of soda and then distilled with steam. The precipitate which remains is filtered off and, after drying, recrystallised from chlorobenzene. A white powder which melts at 231–232° is obtained.

*Example 4*

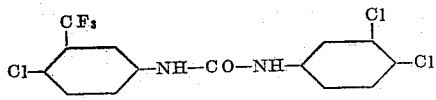

188 parts of 3.4-dichlorophenyl isocyanate, produced by methods known per se from 3.4-dichlororaniline and phosgene, are dissolved at 60° in 1000 parts of abs. chlorobenzene. 196 parts of 1-amino-4-chloro-3-benzotrifluoride are added to this solution and the whole is heated for 10 hours at 95–98°. After cooling, the precipitated crystalline precipitate is filtered off, washed with chlorobenzene and dried in the vacuum at 90–100°. A white powder is obtained which melts at 242–243°.

$C_{14}H_8ON_2Cl_3F_3$—Calculated: N 7.3, Cl 27.8, F 14.8%. Found: N 7.4, Cl 27.5, F 14.7%.

*Example 5*

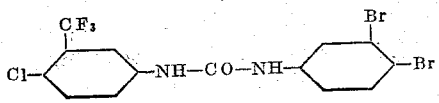

222 parts of 4-chloro-3-trifluoromethyl-phenylisocyanate are heated for 10 hours at 95–98° in 1000 parts of abs. chlorobenzene with 251 parts of 3.4-dibromo-1-aniline. After cooling, the precipitate which separates is filtered off, washed with chlorobenzene and dried at 90–100° in the vacuum. A white crystalline powder which melts at 251–253° is obtained.

$C_{14}H_8ON_2ClBr_2F_3$—Calculated: N 5.9, Cl 7.5, Br 33.8%. Found: N 6.1, Cl 7.4, Br 33.9%.

*Example 6*

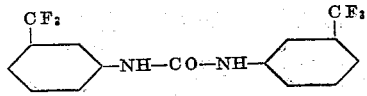

3-trifluoromethyl-phenylisocyanate is produced by methods known per se by reacting phosgene with 1-amino-3-benzotrifluoride in chlorobenzene at 100°.

18.7 parts of 3-trifluoromethyl-phenylisocyanate in 200 parts of abs. chlorobenzene and 16.1 parts of 1-amino-3-benzotrifluoride are heated for 5 hours at 90–95°, after which the reaction mixture is cooled to room temperature. The precipitated residue is filtered off, washed with chlorobenzene and dried. The white powder so obtained melts at 194–195°.

$C_{15}H_{10}ON_2F_6$ — Calculated: N 8.0%. Found: N 8.0%.

*Example 7*

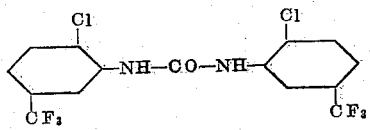

The solution of 195 parts of 1-amino-2-chloro-5-benzotrifluoride in 400 parts of abs. chlorobenzene is added dropwise while introducing phosgene at 50° to 400 parts of chlorobenzene containing 30 parts of phosgene. Phosgene is introduced at 50–60° until a clear solution is obtained. The solution is then heated for 12 hours at 95–98° and after cooling, dry air is passed through until all excess phosgene and hydrogen chloride have been removed. This solution can be used directly for the further reaction without the 2-chloro-5-trifluoromethyl-1-phenyl-isocyanate having to be isolated.

22.1 parts of 2-chloro-5-trifluoromethyl-1-phenyl-isocyanate dissolved in 100 parts of chlorobenzene are reacted at 40° with a solution of 1-amino-2-chloro-5-benzotrifluoride in 100 parts of chlorobenzene and heated for 6 hours at 100°. The 2.2'-dichloro-5.5'-trifluoromethyl-1.1'-diphenyl urea formed is worked up as described in Example 6. It is a white powder which melts at 221–222°.

$C_{15}H_8ON_2Cl_2F_6$—Calcuated: N 6.7%. Found: N 6.9%.

*Example 8*

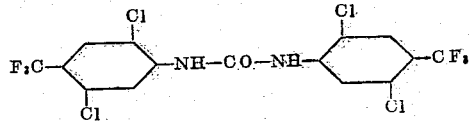

1-amino-2.5-dichloro-4-benzotrifluoride is reacted with phosgene in the manner described in Example 7 to give a solution of 2.5-dichloro-4-trifluoromethyl-phenylisocyanate.

If in Example 6, 25.6 parts of 2.5-dichloro-4-trifluoromethyl-phenylisocyanate so obtained are used instead of the 18.7 parts of 3-trifluoromethyl-phenylisocyanate and if 23 parts of 1-amino-2.5-dichloro-4-benzotrifluoride are used instead of the 16.1 parts of 1-amino-3-benzotrifluoride and otherwise the same procedure is followed, a white powder which melts at 234–236° is obtained.

1-amino-2.5-dichloro-4-benzotrifluoride is produced as follows: 1-amino-4-chloro-3-benzotrifluoride is acetylated, nitrated; the acetylamino group is saponified, diazotised and replaced by chlorine according to Sandmeier. The nitro group is then reduced. 1-amino-2.5-dichloro-4-benzotrifluoride melts at 118–121°. The acetyl derivative melts at 141–142°.

$C_{15}H_6ON_2Cl_4F_6$—Calculated: N. 5.7, Cl. 29.2%. Found: N. 5.8, Cl 29.0%.

Example 9

1 part of the compound according to Example 1 is dissolved in 20 parts of glycol monomethyl ether, 4 parts of sulphonated castor oil are added and this solution is poured into 6000 parts of cold water. A homogeneous, milky, cloudy solution is obtained into which 200 parts of wool which have been previously wetted well are entered. The bath is then warmed to 60°, 40 parts of 10% sulphuric acid are added and the bath is brought to the boil. It is kept boiling for 30 minutes while keeping the goods moving well, then the wool is rinsed well and dried. The wool so treated is protected from injury by keratine-eating larvae of moths, Attagenus and Anthrenus species. The protection remains even after repeated washings.

The following compounds can be produced in a manner corresponding to that described in Example 1; wool treated with these compounds is protected from injury by certain moth and beetle larvae.

| Isocyanate | Amine | Formula of the resulting urea derivitive | M. P. degrees |
|---|---|---|---|
| Cl–⌬(CF₃)–NCO | Cl–⌬(CF₃)–NH₂ (Cl ortho) | Cl–⌬(CF₃)–NH–CO–NH–⌬(CF₃)–Cl | 214–215 |
| Cl–⌬(CF₃)–NCO | ⌬(CF₃)–NH₂ | Cl–⌬(CF₃)–NH–CO–NH–⌬(CF₃) | 179–180 |
| Cl–⌬(CF₃)–NCO | F₃C–⌬(Cl,Cl)–NH₂ | Cl–⌬(CF₃)–NH–CO–NH–⌬(Cl,Cl)–CF₃ | 207–210 |
| Cl–⌬(CF₃)–NCO | F₃C–⌬(Cl)–NH₂ | Cl–⌬(CF₃)–NH–CO–NH–⌬(Cl)–CF₃ | 195–196 |
| Cl–⌬(CF₃)–NCO | Br–⌬(Cl)–NH₂ | Cl–⌬(CF₃)–NH–CO–NH–⌬(Cl)–Br | 228–229 |
| Cl–⌬(CF₃)–NCO | Cl–⌬(Cl)–NH₂ | Cl–⌬(CF₃)–NH–CO–NH–⌬(Cl)–Cl | 304–306 |
| Cl–⌬(CF₃)–NCO | H₅C₂O–⌬(CF₃)–NH₂ | Cl–⌬(CF₃)–NH–CO–NH–⌬(CF₃)–OC₂H₅ | 168–170 |
| Cl–⌬(CF₃)–NCO | ⌬(Cl,Cl)–NH₂ | Cl–⌬(CF₃)–NH–CO–NH–⌬(Cl,Cl) | 199–200 |
| Cl–⌬(CF₃)–NCO | Cl–⌬–NH₂ | Cl–⌬(CF₃)–NH–CO–NH–⌬–Cl | 214–215 |
| Cl–⌬(CF₃)–NCO | Br–⌬(Br)–NH₂ | Cl–⌬(CF₃)–NH–CO–NH–⌬(Br)–Br | 204–206 |
| Cl–⌬(CF₃)–NCO | Br–⌬–NH₂ | Cl–⌬(CF₃)–NH–CO–NH–⌬–Br | 264–266 |
| Cl–⌬(CF₃)–NCO | H₅C₂O–⌬(Cl)–NH₂ | Cl–⌬(CF₃)–NH–CO–NH–⌬(Cl)–OC₂H₅ | 144–146 |

| Isocyanate | Amine | Formula of the resulting urea derivitive | M. P. degrees |
|---|---|---|---|
| NO₂—⬡—NCO | CF₃, Cl—⬡—NH₂ | Cl—⬡(CF₃)—NH—CO—NH—⬡—NO₂ | 285–287 |
| Cl, CF₃—⬡—NCO | CF₃—⬡—NH₂ | Cl—⬡(CF₃)—NN—CO—NH—⬡—CF₃ | 167–168 |
| Cl, CF₃—⬡—NCO | F₃C—⬡(Cl)—NH₂ (Cl) | Cl—⬡(CF₃)—NH—CO—NH—⬡(Cl)—CF₃ | 190–192 |
| Cl, CF₃—⬡—NCO | Cl—⬡(Cl)—NH₂ | Cl—⬡(CF₃)—NH—CO—NH—⬡(Cl)—Cl | 228–230 |
| Cl, CF₃—⬡—NCO | Br—⬡(Cl)—NH₂ | Cl—⬡(CF₃)—NH—CO—NH—⬡(Cl)—Br | 218–220 |
| Cl, CF₃—⬡—NCO | Br—⬡(Br)—NH₂ | Cl—⬡(CF₃)—NH—CO—NH—⬡(Br)—Br | 212–213 |
| Cl, CF₃—⬡—NCO | Cl—⬡(Cl,Cl)—NH₂ | Cl—⬡(CF₃)—NH—CO—NH—⬡(Cl,Cl)—Cl | 220–222 |
| F₃C—⬡(Cl,Cl)—NCO | Cl—⬡—NH₂ | F₃C—⬡(Cl,Cl)—NH—CO—NH—⬡—Cl | 235–236 |

What we claim is:

1. A diphenyl urea compound having the general formula:

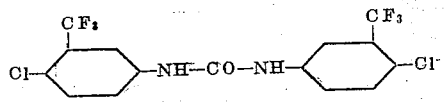

wherein one X represents the trifluoromethyl group and the other X represents a member selected from the group consisting of hydrogen, chlorine and bromine, one Y represents a member selected from the group consisting of chlorine, bromine and the trifluoromethyl group, the other Y represents a member selected from the group consisting of hydrogen, chlorine and bromine and Z represents a member selected from the group consisting of hydrogen, chlorine and bromine.

2. A diphenyl urea compound having the formula:

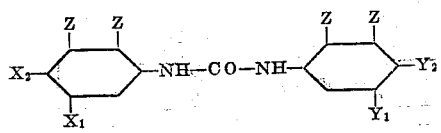

3. A diphenyl urea compound having the formula:

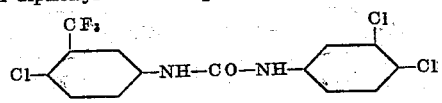

4. A diphenyl urea compound having the formula:

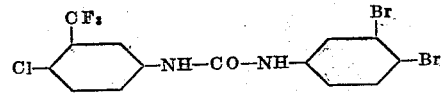

5. A diphenyl urea compound having the formula:

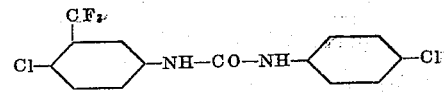

6. A diphenyl urea compound having the formula:

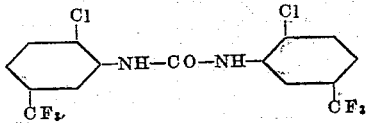

References Cited in the file of this patent

Dieke et al.: J. Pharmacol. 90, 260–270 (1947).